Sept. 20, 1955     L. H. TRAHAN     2,718,310
STRAINER ATTACHMENT FOR MILKING MACHINES
Filed Sept. 23, 1954     2 Sheets—Sheet 1
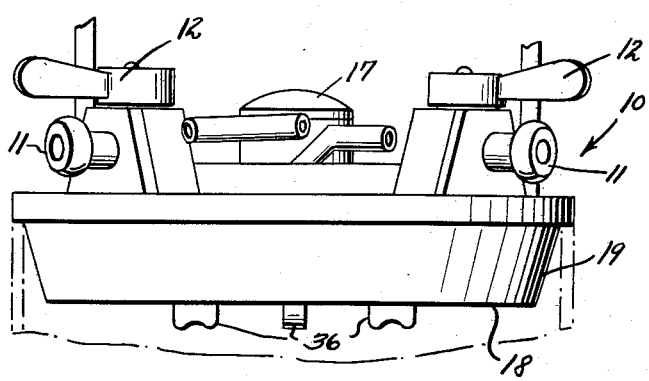
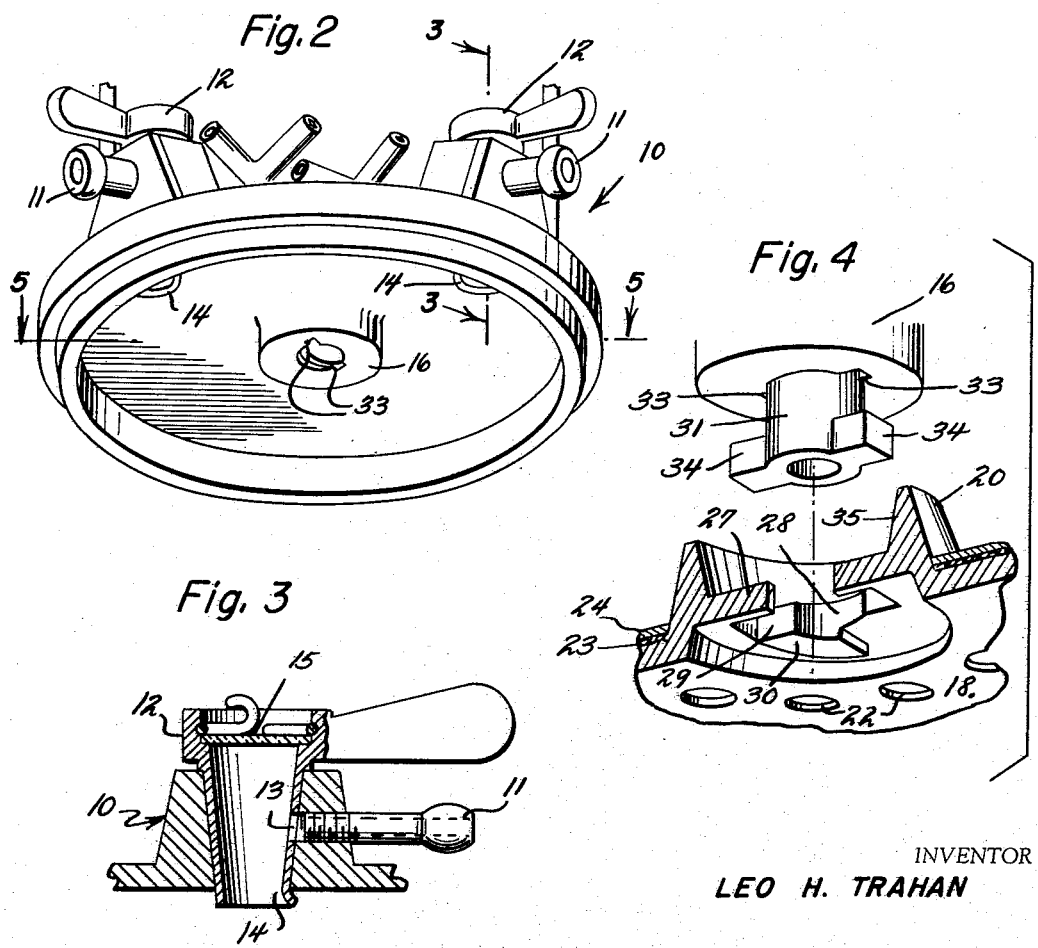
INVENTOR
LEO H. TRAHAN
BY Wilkinson & Mawhinney
ATTORNEYS

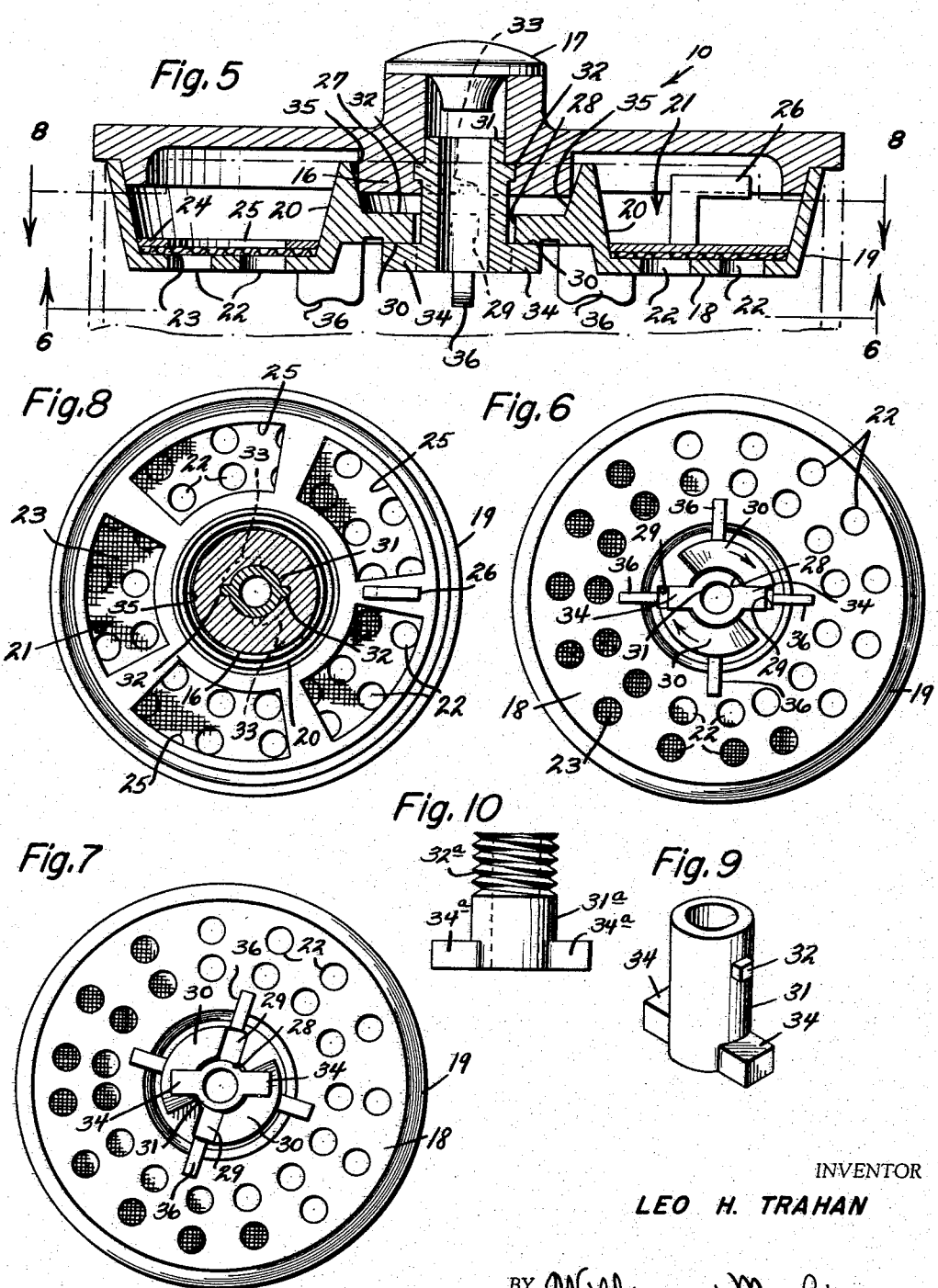

United States Patent Office 2,718,310
Patented Sept. 20, 1955

2,718,310

STRAINER ATTACHMENT FOR MILKING MACHINES

Leo H. Trahan, Highgate, Vt.

Application September 23, 1954, Serial No. 457,956

5 Claims. (Cl. 210—159)

The present invention relates to strainer attachment for milking machines, and has for an object to provide a strainer assembly attached to the cover of the milk collecting vessel and readily removed from it.

Another object of the invention is to provide a strainer assembly which can be taken apart readily for cleaning and for replacement of the filter element itself.

A further object of the invention is to provide a filter which will indicate directly, which, if any, of the cows being milked are afflicted with mastitis.

A still further object of the invention is to provide a strainer attachment for milking machines in the nature of a milk saver to the end that none of the milk is lost and a full yield of strained milk is delivered to the milk collecting vessel.

A still further object of the invention is to provide a strainer attachment for milking machines in which any foam created by the bulk milk will remain in the strainer or filter and will not be drawn from the bulk milk in the collecting vessel into the pipe line and pulsator, and in this aspect of the invention the same avoids accumulation of bacteria in said pipe line and pulsator and dispenses with the necessity for cleaning the same after every use.

A still further object of the invention is to provide a strainer attachment for milking machines in which pressure and weight of the milk on the filter element is avoided in contrast to prior machines in which such pressure and weight are brought to bear on the filtering element, and these factors have caused particles of dirt and foreign matter to be pushed through the filter element into the bottom portion of the milking machine pail.

A still further object of the invention is to provide an improved filtering unit affording a wide filter surface area for the comparatively slow straining of the milk to the end that a more complete and more effective straining is achieved.

A still further object of the invention is to provide an improved detachable connection between the strainer unit or assembly and the cover of the milk collecting vessel to the end that the unit may be attached to and removed from the cover in a more facile manner and practically instantaneously, the unit being so constructed and arranged in relation to the cover attaching part that the unit may be substantially locked in place on the cover without any likelihood of displacement incident to milking operation.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevational view of a strainer attachment for milking machines as constructed in accordance with the present invention, illustrated as mounted upon a conventional cover for the milking vessel, which vessel is indicated fragmentarily in broken lines.

Figure 2 is a perspective view of the conventional cover slightly modified to receive the strainer attachment.

Figure 3 is a vertical section taken on an enlarged scale through the cut-off valve on the line 3—3 of Figure 2.

Figure 4 is a fragmentary perspective view on an enlarged scale of the detachable connection between the cover and strainer attachment.

Figure 5 is a vertical central sectional view taken through the cover and strainer attachment on the line 5—5 of Figure 2.

Figure 6 is a bottom plan view taken on the line 6—6 of Figure 5 with the parts in an initial position before being interlocked.

Figure 7 is a similar view after interlocking.

Figure 8 is a horizontal sectional view taken on the line 8—8 of Figure 5.

Figure 9 is a perspective view of a form of hollow plug employed.

Figure 10 is a similar view of the hollow plug showing a screw threaded arrangement for attaching the plug to the cover.

The details of the milking machine itself need not be gone into, since they form no part of the present invention except to supply its setting. With a portable milker it is customary to milk two cows at a time, with the milk collecting vessel (not shown) placed between them. The vessel is provided with a hollow cover 10 which is fitted with two nipples 11 to which flexible milk lines may be connected. The nipples 11 may be cut off by hollow rotatable valves 12, each having a side opening or port 13 adapted to be rotated into and out of registry with its respective nipple 11. Each valve 12 has a bottom opening 14 for discharging the milk downwardly by gravity into the collecting vessel. The upper end of each hollow rotatable valve 12 is closed by a glass inspection closure 15 so that it can be determined whether or not milk is actually flowing. A central nipple 16 joins the interior of the hollow cover 10 with the milk collecting vessel, this nipple 16 being closed by a freely movable mushroom type valve 17 which permits a vacuum to be maintained in the vessel.

The strainer unit or filter cup is comprised generally of a flat bottom 18, an outer upstanding substantially vertical wall 19 and an inner upstanding substantially vertical inner wall 20. The bottom and the walls 19 and 20 constitute a trough 21. Where the walls 19 and 20 are annular and concentric the trough 21 will be circular. The inner surfaces of the walls 19 and 20, that is the surfaces facing the trough 21, are preferably inclined downwardly and inwardly of the trough 21. In other words, these surfaces are downwardly convergent. The flat bottom 18 is provided with perforations 22 for the passage of the milk therethrough. A milk filter gauze or other filter element 23, which is also in the form of a flat ring, loosely and removably rests upon the flat bottom 18 of the trough 21 and is normally maintained in place and in a substantially flat condition by a filter retaining ring 24 having slots 25 or other openings to permit the passage of milk from the trough 21 down through the filter element 23 and through the slots or perforation 22 into the receiving vessel. If desired a handle 26 may upstand from a convenient position on the filter retaining ring 24 to enable this ring to be lifted to expose the filter element 23.

Centrally of the cup or trough is a central web 27 in the nature of a hub having a central opening 28 and diametrically opposite slots 29 radiating from the outer portion of this central opening 28. Spiral cam surfaces 30 are formed on the under side of the web 27 with their low points originating at the slots 29.

A hollow plug or spud 31 open at both ends is of an external diameter to be easily and snugly fitted through the central opening 28. Diametrically opposite pins 32 projecting radially out from this hollow plug 31 are adapted to engage bayonet slots 33 on the interior of the central nipple 16 of the hollow cover 10. The lower end of the hollow plug 31 carries diametrically opposite arms 34 of a size and relative position to be entered through the radial slots 29. Upwardly flaring guide surfaces 35 are formed on the interior of the circular wall 20 in position to engage the external surfaces of the central nipple 16 for the purpose of guiding the upper end of the hollow plug 31 into the interior of such nipple. Bosses or lugs 36 project downwardly from the trough bottom 18 at spaced angular points around the circle of the trough. The central web 27 is preferably stepped up from the bottom 18 and the lugs 36 are cast or otherwise secured to the bottom 18 and web 27 at the angular junction between these two parts.

In assembling the strainer attachment to the hollow cover 10 of the milk collecting vessel, the hollow plug or spud 31 may first be entered upwardly into the central nipple 16 of the cover 10, care being exercised so that the pins 32 are properly entered in the bayonet slots 33. The arms 34 are useful in rotating the plug 31 so that the pins 32 become properly interlocked in the bayonet slots 33. The hollow plug 31 thereupon becomes an extension of the central nipple 16 and as this plug 31 is open at both ends, it places the milk collecting vessel in communication with the vacuum pulsating device of the milking machine. The plug 31 also constitutes a support for the filter cup or trough 21 from which that cup as a unit may be conveniently attached to and detached from the plug 31 as a support.

For installing the filter cup upon the cover 10, the cup is elevated in such position that the slots 29 receive therethrough the arms 34 of the plug 31. After the cup has been raised to a position where the web 27 has cleared the arms 34, the cup is rotated, using the bosses 36 for convenience in so doing, so that the cam surfaces 30 ride around on the upper surfaces of the arms 34 from the low points to the high points of these cam surfaces 30 which results in elevating the cup so that the upper free ends of the walls 19 and 20 may close against the bottom of the hollow cover 10 with the trough 21 lying below the bottom openings 14 of the valves 12.

In detaching the cup from the cover, the cup is rotated reversely so that the central web 27 may progressively descend upon the cam surfaces 30 until the slots 29 arrive vertically above the arms 34, in which position the cup is free to be lowered from all engagement with the hollow plug 31.

The milk coming from the spigots enters through the inlet ports 14 of the valves 12 which are disposed substantially above the trough. Such milk as encounters the inner downwardly tapering surface of the outer wall 19 will be deflected to the flat portion of the trough containing the filter element. The milk will thereupon drain through the openings in the filter retaining ring, through the milk filter gauze and through the holes in the bottom of the filter cup, thence dripping into the milking pail. This process results in the detention of any foreign matter, including gargets from a mastitis cow, such foreign matter remaining on the upper portion of the filter element. The milk alone drains through the filter gauze to the pail. Through this means, a cow having mastitis can be easily detected.

The milk saver attached to the milking pail head will permit the pulsator to draw air directly from the pail through the hollow plug 31 without taking in any foam created by the bulk milk. In other words the foam will remain in the trough portion of the filter cup.

Under ordinary circumstances, the milking machine pail without the milk saver draws warm foam from the bulk milk in the bottom of the milking machine pail, which foam thereupon passes into the pipe line and pulsator. This results in the accumulation of bacteria if said pipe line and pulsator are not cleaned after every use. With the use of the present device only clean air is drawn through the opening in the center plug 31 and nipple 16.

Use of the present invention permits the milk coming from the spigots 14 to drop continuously and to filter through the filter retaining ring, filter gauze and filter cup into the pail without any accumulation of milk. In the conventional type of strainer, considerable pressure is brought to bear against the filter pad due to the weight and large volume of milk dumped into the strainer at one time. The pressure and weight of the milk causes particles of dirt and foreign matter to be pushed through the filter element into the bottom portion of the milking machine pail. The improved milk saver eliminates this pressure, as the milk is filtered as it is milked from the cow.

It will be appreciated that a device according to the invention is applicable as an attachment for all milking machine pails, that it strains the milk at source while warm and due to the completely enclosed filter element, the milk is protected from contamination of flies and insects. For the same reason barn dirt and dust cannot come into contact with the milk.

The device not only detects mastitis quickly during milking, but indicates the cow infected and prevents shipment of contaminated milk.

The device also prevents foaming in the pail and prevents clogging and contamination of milk suction lines.

The device also saves time in cleaning milk suction lines.

The device attaches to the underside of a milk pail lid with a double lock.

The device has few parts which may be made preferably from pure virgin aluminum. The device is thus easily washed and sterilized.

The four lugs 36 are useful not only to turn the device for locking and unlocking but also act to support the cmover assembly on a bench. The handle 26 also adds convenience in changing filter discs. The device discontinues can straining.

Filter discs are available at all supply houses.

Referring more particularly to Figure 10 a modified form of plug 31a is shown in which screw threads 32a replace the lugs 32 of Figure 9 in order that the plug may be screw threaded into the cover instead of being attached by the bayonet joint arrangement.

Although I have disclosed herein the best form of the invention known to me at this time, I reserve the right to all such modifications and changes as may come within the scope of the following claims.

What is claimed is:

1. For use with the cover of the vessel of a milking machine, a strainer attachment comprising a cup having a perforated bottom, a filter element carried by said bottom, a slotted web centrally of the cup, and means adapted to be carried by the cover having arms receivable through the slots, said web having under spiral cam surfaces rotatable on the arms to cause a progressive elevating movement of the cup incident to its mounting upon the cover.

2. For use with the cover of the vessel of a milking machine, a strainer attachment comprising a cup having a perforated bottom, a filter element supported on said bottom, a web centrally of the cup having slots therein, a support member adapted to be suspended from the cover and having arms for passing through the slots, said web having under spiral cam surfaces for rotating on said arms to elevate the cup toward the cover.

3. A strainer attachment for milking machines comprising a cover for the milking machine having a milk delivery opening and a hollow nipple for placing the vessel in communication with the vacuum impulse device of the machine, said nipple having an internal bayonet slot, a hollow open ended plug insertible in said nipple and having means for interlocking in the bayonet slot, arms projecting laterally from the lower end of said plug, a filter cup having an opening with slots radiating therefrom in position to receive therethrough the arms of the plug, means for supporting the cup upon a bench and also for facilitating the rotation of the cup, and spiral cam surfaces on the cup adapted to rotate upon the upper surfaces of the arms to lift the cup toward the cover incident to the rotation of the cup in one direction by said supporting and rotation means.

4. A strainer attachment for milking machines comprising a cover for the milking machine having a milk delivery opening and a hollow nipple for placing the vessel in communication with the vacuum impulse device of the machine, a hollow open ended plug supported in said nipple, arms projecting laterally from said plug, a filter cup having an opening with slots radiating therefrom in position to receive therethrough the arms of the plug, and cam surfaces on the cup adapted to rotate upon the upper surfaces of the arms to lift the cup toward the cover incident to the rotation of the cup in one direction so that the upper edges of the filter cup will close against the bottom of the cover.

5. For use with the cover of the vessel of a milking machine, filtering means adapted to be detachably mounted on the cover having at least one slot and at least one cam surface, and means adapted to be carried by the cover having at least one portion receivable through the slot, said cam surface and said portion being relatively rotatable upon one another to cause a progressive movement of the filtering means and the cover towards each other incident to the mounting of the filtering means upon the cover.

References Cited in the file of this patent

UNITED STATES PATENTS

| | | |
|---|---|---|
| 729,693 | Steinkoenig | June 2, 1903 |
| 831,767 | Boden | Sept. 25, 1906 |
| 1,649,834 | Lomax | Nov. 22, 1927 |
| 1,849,672 | Jansson | Mar. 15, 1932 |
| 2,139,924 | Woodruff | Dec. 13, 1938 |
| 2,547,797 | Torrey et al. | Apr. 3, 1951 |